United States Patent
Levasseur et al.

(10) Patent No.: US 8,753,532 B2
(45) Date of Patent: *Jun. 17, 2014

(54) POSITIVE ELECTRODE MATERIALS COMBINING HIGH SAFETY AND HIGH POWER IN A LI RECHARGEABLE BATTERY

(75) Inventors: Stephane Levasseur, Brussels (BE); Philippe Carlach, Antwerp (BE); Randy De Palma, Maasmechelen (BE); Michèle Van Thournout, Isières (BE)

(73) Assignee: Umicore, Brussels (BE)

( * ) Notice: Subject to any disclaimer, the term of this patent is extended or adjusted under 35 U.S.C. 154(b) by 216 days.

This patent is subject to a terminal disclaimer.

(21) Appl. No.: 13/209,693

(22) Filed: Aug. 15, 2011

(65) Prior Publication Data

US 2012/0074351 A1    Mar. 29, 2012

Related U.S. Application Data

(60) Provisional application No. 61/344,556, filed on Aug. 20, 2010.

(30) Foreign Application Priority Data

Aug. 17, 2010  (EP) ..................... 10008566

(51) Int. Cl.
*H01M 4/88* (2006.01)

(52) U.S. Cl.
USPC ........ 252/182.1; 429/188; 429/217; 429/221; 429/231.95

(58) Field of Classification Search
USPC .......... 252/182.1; 429/217, 221, 188, 231.95
See application file for complete search history.

(56) References Cited

U.S. PATENT DOCUMENTS

| 8,192,715 B2 | 6/2012 | Kawasato et al. |
| 2006/0263690 A1 | 11/2006 | Suhara et al. |

(Continued)

FOREIGN PATENT DOCUMENTS

| EP | 2169745 | 3/2010 | |
| JP | 2004119218 | 4/2004 | |
| JP | 2008-153017 | * 7/2008 | ............. H01M 4/58 |
| WO | WO 2005064715 | 7/2005 | |

OTHER PUBLICATIONS

Choi et al., "Particle Size Effects on Temperature-Dependent Performance of $LiCoO_2$ in Lithium Batteries," Journal of Power Sources, vol. 158, (2006), pp. 1419-1424.

(Continued)

*Primary Examiner* — Khanh Tuan Nguyen
(74) *Attorney, Agent, or Firm* — Brinks Gilson & Lione

(57) ABSTRACT

The invention relates to a $Li_aNi_xCo_yMn_{y'}M'_zO_2$ composite oxide for use as a cathode material in a rechargeable battery, with a non-homogenous Ni/M' ratio in the particles, allowing excellent power and safety properties when used as positive electrode material in Li battery. More particularly, in the formula $0.9 < a < 1.1$, $0.3 \leq x \leq 0.9$, $0 < y \leq 0.4$, $0 < y' \leq 0.4$, $0 < z \leq 0.35$, $e < 0.02$, $0 \leq f \leq 0.05$ and $0.9 < (x+y+y'+z+f) < 1.1$; M' consists of either one or more elements from the group Al, Mg, Ti, Cr, V, Fe, Mn and Ga; N consists of either one or more elements from the group F, Cl, S, Zr, Ba, Y, Ca, B, Sn, Sb, Na and Zn. The powder has a particle size distribution defining a D10, D50 and D90; and the x and z parameters varying with the particles size of the powder, and is characterized in that either one or both of:

Figure 1:
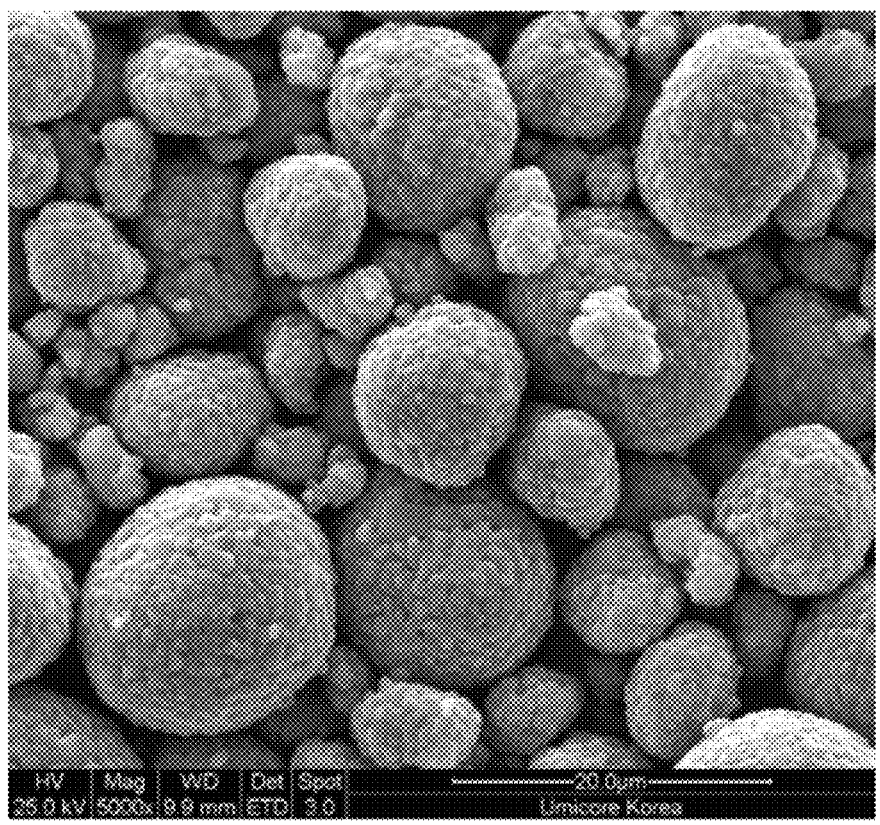

$x1-x2 \geq 0.005$ and $z2-z1 \geq 0.005$;

x1 and z1 being the parameters corresponding to particles having a particle size D90; and x2 and z2 being the parameters corresponding to particles having a particle size D10.

14 Claims, 7 Drawing Sheets

(56) References Cited

U.S. PATENT DOCUMENTS

| | | |
|---|---|---|
| 2009/0117469 A1 | 5/2009 | Hiratsuka et al. |
| 2009/0148772 A1 | 6/2009 | Kawasato et al. |
| 2009/0239143 A1* | 9/2009 | Miyazaki et al. ............ 429/188 |
| 2010/0081055 A1 | 4/2010 | Konishi et al. |

OTHER PUBLICATIONS

Jiang et al., "Effects of Particle Size and Electrolyte Salt on the Thermal Stability of $Li0.5CoO_2$," Electrochimica Acta, vol. 49, (2004), pp. 2661-2666.

* cited by examiner

POSITIVE ELECTRODE MATERIALS COMBINING HIGH SAFETY AND HIGH POWER IN A LI RECHARGEABLE BATTERY

This application claims priority to European Patent Application No. 10008566.1, filed Aug. 17, 2010, and U.S. Provisional Patent Application No. 61/344,556, filed Aug. 20, 2010, the entire contents of which are hereby incorporated by reference.

TECHNICAL FIELD AND BACKGROUND

The invention relates to a $Li_aNi_xCo_yMn_yM'_zO_2$ composite oxide (M' being Al, Mg, Ti, Cr, V, Fe, Ga) with a non-homogenous Ni/M ratio in particles of different sizes, allowing excellent power and safety properties when used as positive electrode material in Li battery.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include LNMCO type cathode materials. LNMCO means lithium-nickel-manganese-cobalt-oxide. The composition is $LiMO_2$ or $Li_{1+x}M_{1-x}O_2$ where $M=Ni_xCo_yMn_yM'_z$. LNMCO has a similar layered crystal structure as $LiCoO_2$ (space group r-3m). The advantage of LNMCO cathodes is the much lower raw material price of the composition M versus Co. The preparation of LNMCO is in most cases more complex than $LiCoO_2$, because special precursors are needed wherein the transition metal cations are well mixed. Typical precursors are mixed transition metal hydroxides, oxyhydroxides or carbonates. Typical LiNMCO-based cathode materials include compositions having a formula $LiNi_{0.5}Mn_{0.3}Co_{0.2}O_2$, $LiNi_{0.6}Mn_{0.2}Co_{0.2}O_2$ or $Li_{1.05}M_{0.95}O_2$, with $M=Ni_{1/3}Mn_{1/3}Co_{1/3}O_2$. Compared with $LiCoO_2$, LNMCO tends to have a lower bulk diffusion rate of lithium, which can limit the maximum possible particle size for a given composition. Depending on the composition, the safety of the charged cathode in a real cell can be a problem. Safety events ultimately are caused by reactions between the oxidized surface and the reducing electrolyte. Thus safety problems are more severe if the particles have a high surface area, which is the case if the particle size is small. The conclusion is that the lower performance of LNMCO requires a small particle size which deteriorates safety.

A way to improve the safety has been to dope LNMCO materials with inert elements such as Al, Mg, Ti, in order to stabilize the structure when heated in the charged state. A drawback to that major improvement regarding safety is the fact that inert element doping is detrimental for power and reversible capacity within the LNMCO material. In order for this material to be industrially usable, manufacturers had to find a compromise between safety and performance, thus using the lowest amounts of Al, Ti and Mg required for obtaining a satisfying safety, while keeping decent power and capacity performances. Recently there have been numerous disclosures about the influence of Mg and Al doping for LNMCO with Ni:Co:Mn=33:33:33, or other compositions as for example $LiNi_{1-x-y}Mn_xCo_yO_2$. It is widely expected that such composition will become a commercial product soon. However, as explained above, these products typically suffer from a difficult compromise between safety and electrochemical performances, thus resulting in medium level of overall performances.

With the appearance of new applications for large batteries on the market (e.g. for hybrid vehicles or stationary power devices) and a need for meeting high safety requirements, without compromising on power performances, it appears that a breakthrough is needed in the synthesis of these NiMnCo-based materials.

As there has always been a concern to manufacture materials that are as homogeneous as possible, the state of the art manufacturing process of $Li_aNi_xCo_yMn_yM'_zO_2$ (M'=Al, Ti, Mg . . . ) products uses doped precursors such as hydroxides (see for example in U.S. Pat. No. 6,958,139), carbonates, nitrates or oxides, that are sintered at temperatures above 600° C. Thus, the material is perfectly homogeneous in composition, and the resulting positive electrode material shows medium level of global performances. Considering fundamentals from solid state chemistry applied to battery materials, it is known that for $LiCoO_2$ material, smaller particle size gives better power performances (as discussed in Choi et al., J. Power Sources, 158 (2006) 1419). It is however also known that a smaller particle size gives lower safety, as safety characteristics are somewhat linked to surface area (see for example Jiang et al., Electrochem. Acta, 49 (2004) 2661). It follows that for the $LiNi_xCo_yMn_yM'_zO_2$ system, where the presence of given amounts of Ni and M' (M' being e.g. Al) are focused respectively on improving power behaviour and safety, a homogenous composition both for small and large particles leads to a compromise between power and safety performance. Real powders have a distribution of particles with different size. However, a homogeneous composition of all particles is not preferred at all. For the small particles in which safety behaviour is directly related to M' content, a higher M' concentration would be needed to achieve the same safety behaviour as for larger particles. On the other hand, less M' (inert doping) is needed in the large particles but a decrease of M' in the large particles would enhance the performances of the $LiNi_xCo_yMn_yM'_zO_2$ system.

The present invention provides a solution to this problem.

SUMMARY

Viewed from a first aspect, the invention can provide a lithium metal oxide powder for use as a cathode material in a rechargeable battery, having a general formula $Li_aNi_xCo_yMn_yM'_zO_{2\pm e}A_f$ with
$0.9<a<1.1$, $0.3 \leq x \leq 0.9$, $0<y \leq 0.4$, $0<y' \leq 0.4$, $0<z \leq 0.35$, $e<0.02$ (mostly $e \approx 0$ or e being close to 0), $0 \leq f \leq 0.05$ and $0.9<(x+y+y'+z+f)<1.1$;
M' consisting of either one or more elements from the group Al, Mg, Ti, Cr, V, Fe and Ga; A consisting of either one or more elements from the group F, C, Cl, S, Zr, Ba, Y, Ca, B, Sn, Sb, Na and Zn; the powder having a particle size distribution defining a D10, D50 and D90; the powder having a particle size distribution defining a D10 and a D90; and wherein either:
$x1-x2 \geq 0.005$; or $z2-z1 \geq 0.005$; or both $x1-x2 \geq 0.005$ and $z2-z1 \geq 0.005$;
x1 and z1 being the parameters corresponding to particles having a particle size D90; and x2 and z2 being the parameters corresponding to particles having a particle size D10.

In one embodiment both $x1-x2 \geq 0.010$ and $z2-z1 \geq 0.010$; in another embodiment $x1-x2 \geq 0.020$ and $z2-z1 > 0.020$ and in another embodiment both $x1-x2 \geq 0.030$ and $z2-z1 \geq 0.030$. The more stringent the conditions for the differences between x1 and x2, z1 and z2, the more pronounced are the effects both on safety and electrochemical performances.

In another embodiment, the Ni content of the powder increases with increasing particle size, and the M' content of the powder decreases with increasing particle size. The Ni content may increase continuously, and the M' content may decrease continuously, resulting in a Ni/M' ratio that varies continuously with particle size.

In yet another embodiment f=0 and M' consists of Al. In another embodiment A consists of either one or both of S and C with f≤0.02. There is also an embodiment where A consists of C, with f≤0.01.

It should be mentioned here that WO2005/064715 describes a cathode active material comprising a lithium transition metal oxide $Li_aM_bO_2$, with $M=A_zA'_{z'}M'_{1-z-z'}$, M' being $Mn_xNi_yCo_{1-x-y}$, A=Al, Mg or Ti and A' being a further dopant, where 0≤x≤1, 0≤y≤1, 0≤z+z'<1, z'<0.02. The composition M of this product varies with the size of the particles. In particular, smaller particles contain less cobalt and more manganese than larger particles. The Ni, Al, Mg and Ti contents however do not vary as described above.

Viewed from a third aspect, the invention can also provide a process for the manufacture of the powder oxide according to the invention, and comprising the steps of:
providing a M-precursor powder, with $M=Ni_xCo_y Mn_{y'}M'_zA_f$, having a particle size distribution defining a D10 and a D90; wherein either x1−x2≥0.005; or z2−z1≥0.005; or both x1−x2≥0.005 and z2−z1≥0.005; x1 and z1 being the values of x and z of particles having a particle size D90; and x2 and z2 being the values of x and z of particles having a particle size D10,
mixing the M-precursor powder with a lithium precursor, preferably lithium carbonate, and
heating the mixture at a temperature of at least 800° C.

The step of providing a M-precursor powder may comprise the steps of:
providing at least two M-precursor powders having a different particle size distribution characterized by different D10 and D90 values, and wherein a M-precursor powder having a lower D10 and D90 value has either one or both of a lower Ni content and a higher M' content, than a M-precursor powder having a higher D10 and D90 value; and
mixing the at least two M-precursor powders.

In one embodiment the at least two M-precursor powders are mixed with the lithium precursor, before heating the mixture at a temperature of at least 800° C.

By precursor powder is understood that these powders are precursors of the $Li_aNi_xCo_yMn_{y'}M'_zO_{2\pm e}A_f$ lithium transition metal oxides, such as provided in some embodiments: hydroxide or oxyhydroxide compositions obtained by precipitating metal sulphates, nitrates, chlorides or carbonates in the presence of an alkali hydroxide and a chelating agent, preferably ammonia.

In an embodiment the difference between the Co content of the M-precursor powder having a lower D10 and D90 value, and the Co content of the M-precursor powder having a higher D10 and D90 value, is less than the difference between both the Ni and M' contents of the M-precursor powders. Also the difference between the Mn content of the M-precursor powder having a lower D10 and D90 value, and the Mn content of the M-precursor powder having a higher D10 and D90 value, is less than the difference between both the Ni and M' contents of the M-precursor powders.

DETAILED DESCRIPTION

The invention can provide a powder having a formula $Li_aNi_xCo_yMn_{y'}M'_zO_2$ for use as positive electrode in Li batteries, and having a non-homogeneous Nickel-M' ratio in the particles for a constant cobalt and/or manganese content. The x and z parameters may vary with the particles size of the powder, either one or both of:
x1−x2≥0.005 and z2−z1≥0.005 may be valid, where x1 and z1 are the parameters corresponding to particles having a particle size D90 of the powder; and x2 and z2 are the parameters corresponding to particles having a particle size D10.

This comes to meet the need for a $Li_aNi_xCo_yMn_{y'}M'_zO_2$ material to be tailored to achieve at the same time a high nickel content for high power in the larger particles and a high stabilizing metal M' content, such as aluminum, for high safety in the smaller ones. Hence, as a result, the relative content of each species is strongly correlated to the size of the particle. The Co % Mn contents can be kept constant whatever the particle size, as this contributes to make the synthesis easier by maintaining the layered character of the $LiNiO_2$-type material.

Compared to prior art and current $Li_aNi_xCo_yMn_{y'}M'_zO_2$ materials, the advantages of the invention are:
improved power performances as the Ni and M' content is optimized (resp. increased and decreased) in the large particles while these large particles are known to be limiting the power performances,
improved safety performances as the Ni and M' content is optimized (resp. decreased and increased) in the fine particles while these small size particles are known to be detrimental for safety.

In an embodiment, the Ni and M' (preferably Al) concentration should follow a continuous increase and decrease respectively with increasing particle size.

In yet another embodiment, Ni and Al should be homogeneously dispersed within each single particle in order to avoid mechanical stresses while intercalating/deintercalating Li when using the powder in a rechargeable battery.

In another embodiment, the use of a $Li_aNi_xCo_yMn_{y'}M'_zO_{2\pm e}A_f$ material with a non-homogenous Ni/Al ratio in its particles in the manufacture of a lithium insertion-type electrode is disclosed, by mixing the powder with a conductive carbon-bearing additive. The corresponding electrode mixture is also claimed.

BRIEF INTRODUCTION TO THE DRAWINGS

FIG. 1: SEM picture of the material according to the invention showing spherical particles of different sizes.

Figure 2:
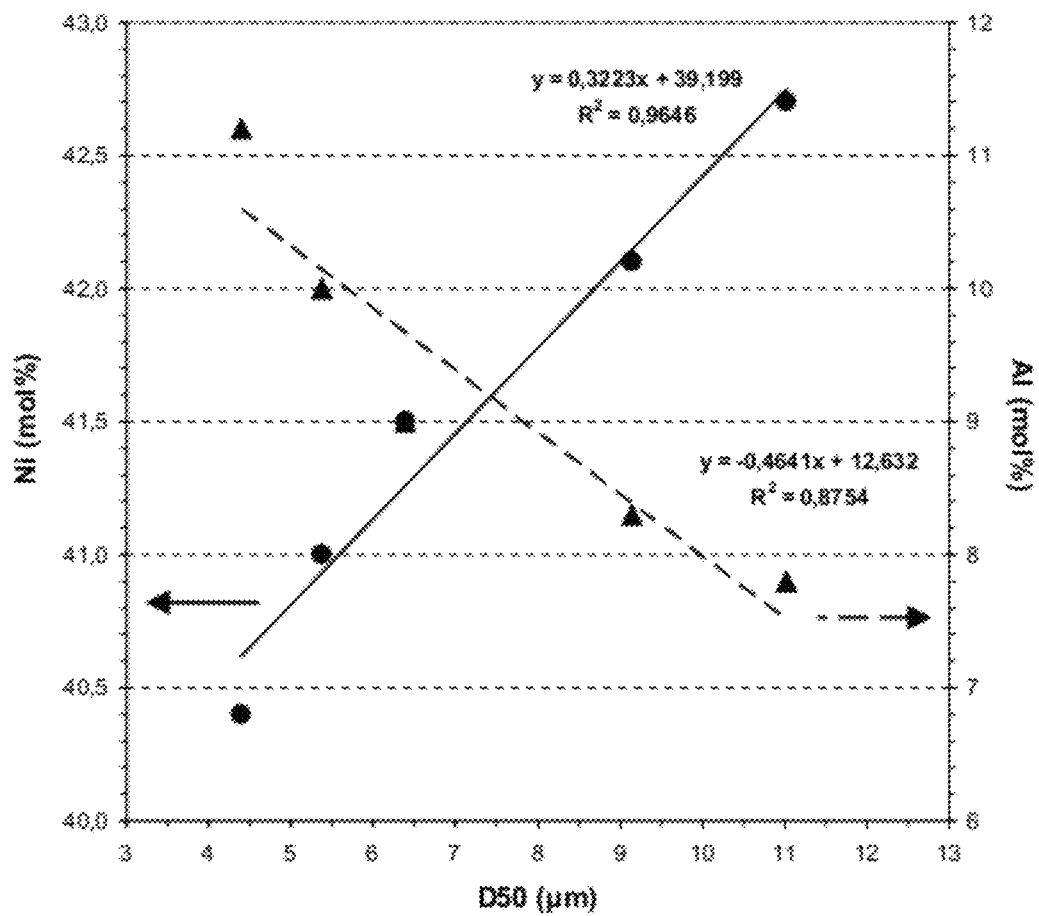

FIG. 2: variation of the Ni and Al content (in mol %) as a function of particle size (D50) in the material according to the invention. This graph clearly shows that the Ni/Al ratio varies continuously with particle size.

Figure 3:
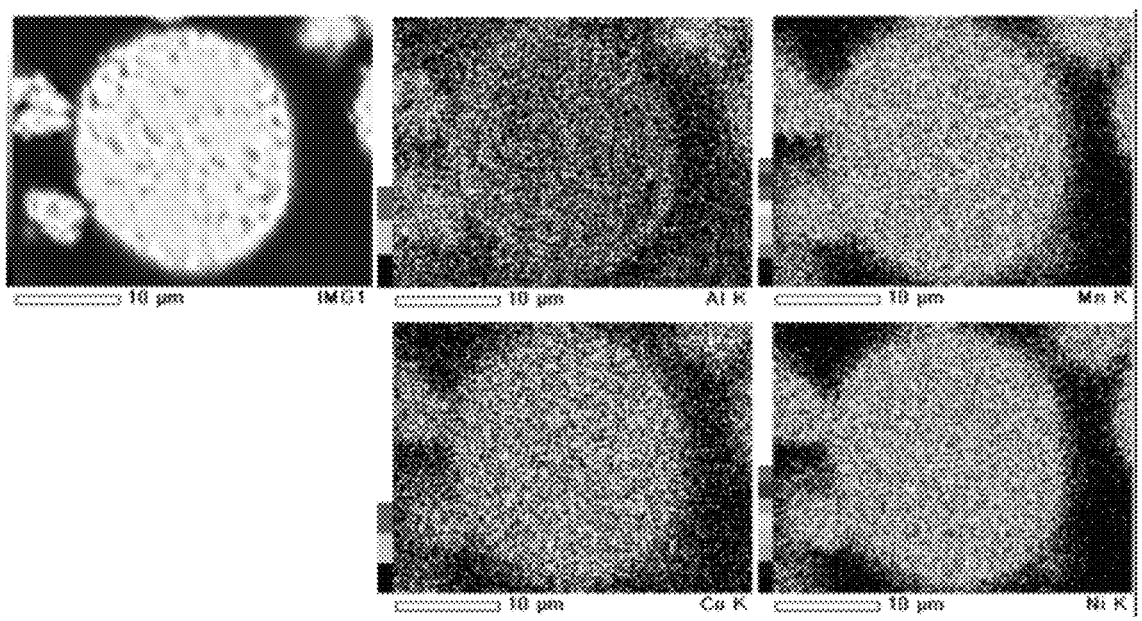

FIG. 3: Ni, Co and Al mapping by EDS on cross-sections of particles of the material according to the invention. This measure clearly shows homogeneous repartition of the species within a single particle.

Figure 4:
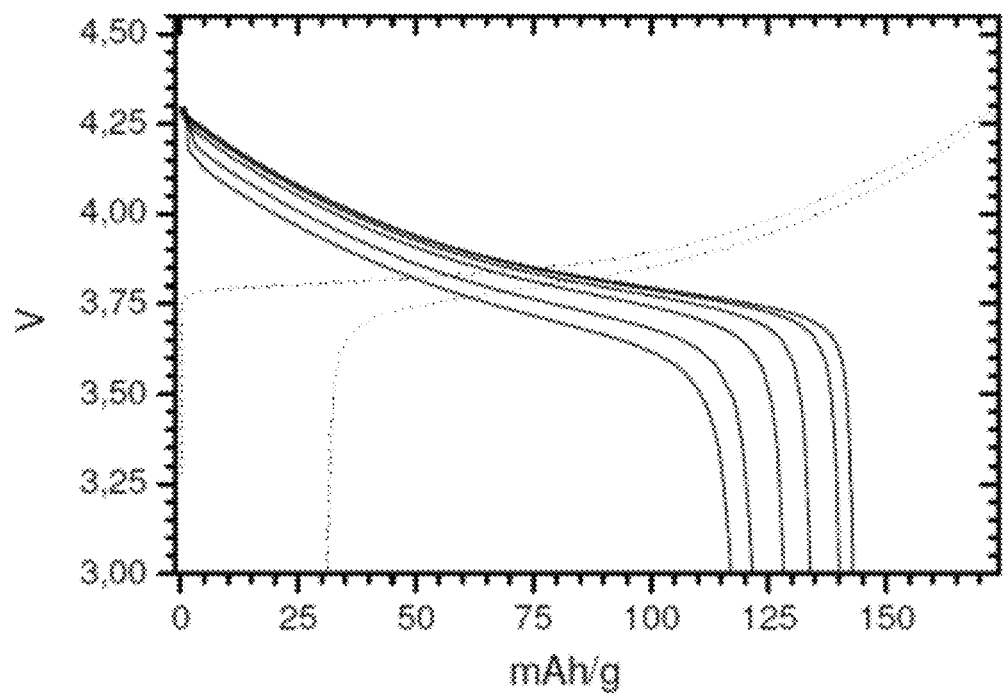

FIG. 4: Galvanostatic discharge curve of the material of the invention at different rates (from right to left: C/10, C/5, C/2, 1 C, 2 C and 3 C). This shows the excellent capacity and power properties of this material.

Figure 5:
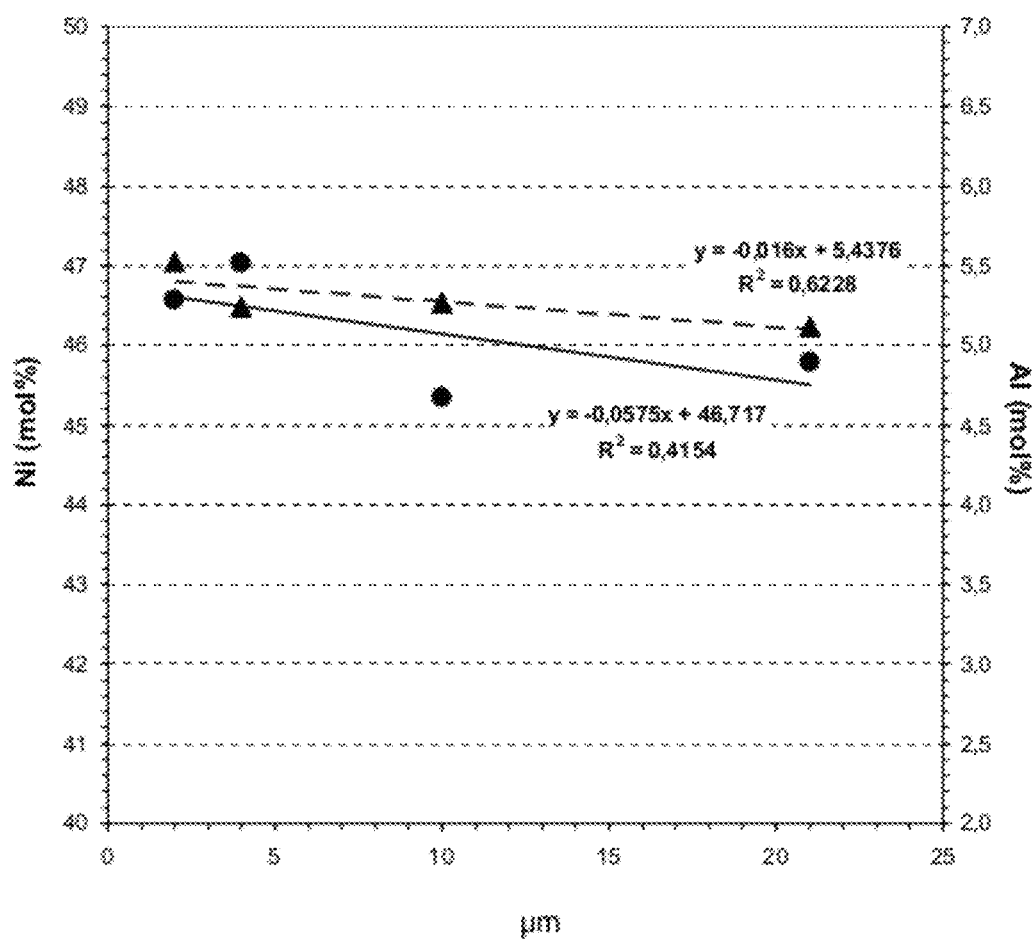

FIG. 5: variation of the Ni and Al content (in mol %) as a function of SEM particle size in the state of the art material. This measurement clearly shows that the Ni/Al ratio is constant whatever the particle size.

Figure 6:
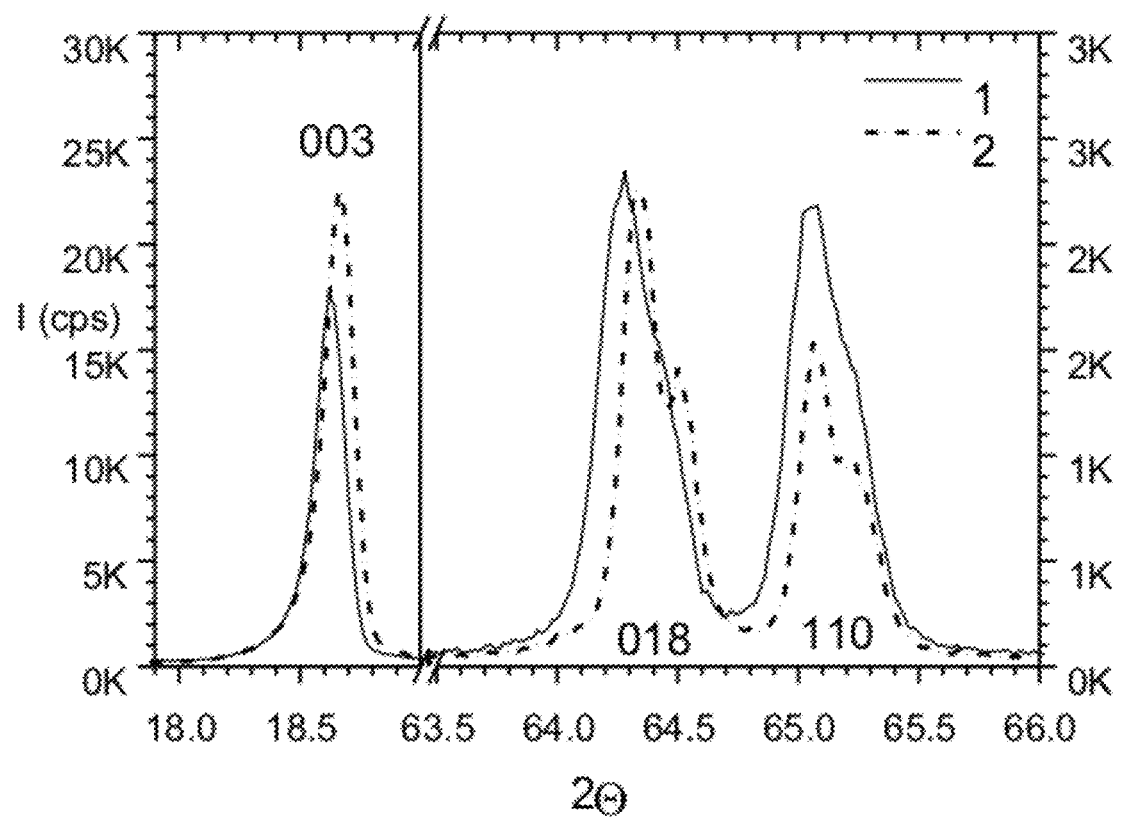

FIG. 6: XRD pattern for size dependent (1) and non size dependent sample (2).

Figure 7:
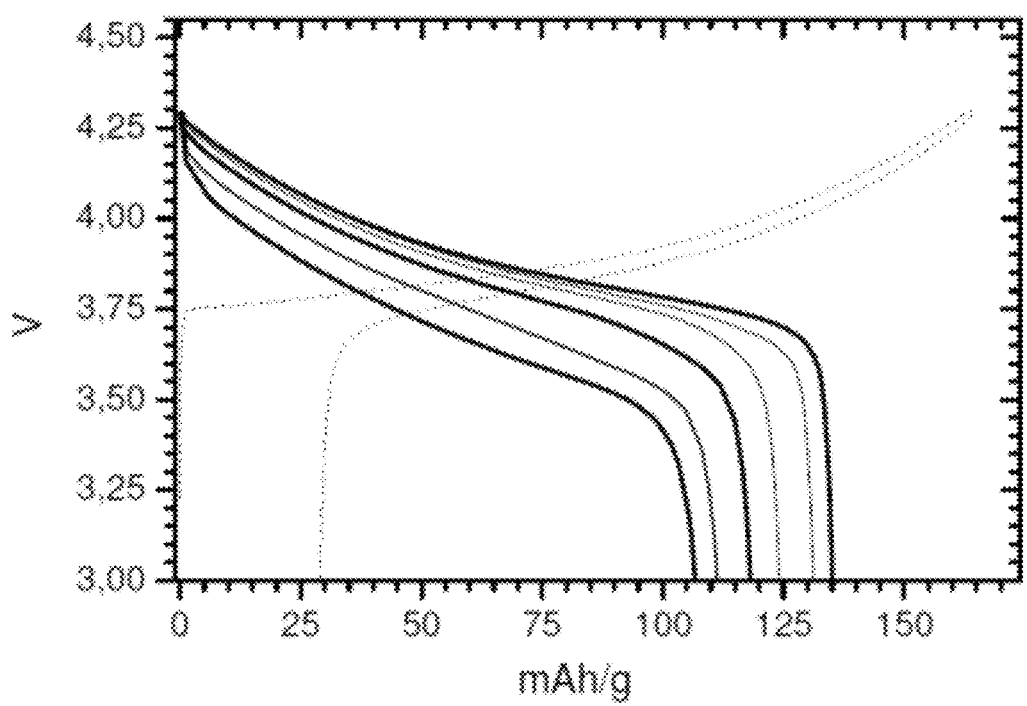

FIG. 7: Galvanostatic discharge curve of the state of the art material at different rates (from right to left: C/10, C/5, C/2, 1

C, 2 C and 3 C). This shows the low capacity and power properties of the state of the art material.

The invention is further illustrated in the following examples:

EXAMPLE 1

In a first step, a composite Ni—Mn—Co—Al (or NMCA) hydroxide precursor with molar composition 39.9:35.2:12.8:12.2 is precipitated from Ni, Mn, Co and Al sulphates in the presence of NaOH and ammonia. The obtained NMCA hydroxide has a spherical shape and the average particle size as measured from laser granulometry is centered around D50=5.4 µm (D10=3.4 µm, D90=8.9 µm).

In a second step, a NMCA hydroxide precursor with molar composition 42.3:35.7:13.7:8.3 is precipitated from Ni, Mn, Co and Al sulphates in the presence of NaOH and ammonia. The obtained NMCA hydroxide shows spherical shape and the average particle size as measured from laser granulometry is centered around D50=9.3 µm (D10=5.0 µm, D90=16.5 µm).

In a third step a NMCA hydroxide precursor with molar composition 44.3:35.8:13.8:6.0 is precipitated from Ni, Mn, Co and Al sulphates in the presence of NaOH and ammonia. The obtained NMCA hydroxide shows spherical shape and the average particle size as measured from laser granulometry is centered around D50=15.5 µm. (D10=11.1 µm, D90=21.7 µm).

In a last step, the three hydroxide precursor powders as synthesized above are mixed in the ratio 0.4:0.3:0.3 and mixed with $Li_2Co_3$ such that Li/(Ni+Co+Mn+Al)=1.075. The mixture is then heated in a tubular furnace under an oxygen flow at 980° C. for 10 h. The global composition of the obtained $Li_aNi_xCo_yMn_yAl_zO_2$ powder as deduced from ICP is Ni:Mn:Co:Al=42.1:35.8:13.8:8.3.

The particle size distribution of the product after firing is measured by laser diffraction granulometry and shows a PSD with D10=5.2 µm, D50=9.1 µm, D90=15.5 µm.

A FEG-SEM and size vs. composition analysis is performed on the $LiNi_xCo_yMn_yAl_zO_2$ material made according to Example 1 (see FIG. 1). The following experiment confirms that the final powder has retained most of the size dependent composition of the precursor. The composition of different fractions of the final powder is measured by ICP. The different fractions (with different particle size) are obtained by elutriation. In an elutriation experiment, powders are separated by settling down in a slow upward flow of liquid. Thus small particles reach the overflow fast, large particles later. The particle size of the different fractions is measured using laser diffraction granulometry. This clearly shows that the chemical composition (Ni:Mn:Co:Al) of the final product is varying as a function of its particle size (see Table 1a & FIG. 2).

TABLE 1a

Molar composition (Ni:Mn:Co:Al) according to particle size.

| D50 (µm) | Ni (mol %) | Mn (mol %) | Co (mol %) | Al (mol %) |
|---|---|---|---|---|
| 4.4 | 40.4 | 35.0 | 13.4 | 11.2 |
| 5.4 | 41.0 | 35.5 | 13.4 | 10.0 |
| 6.4 | 41.5 | 36.0 | 13.5 | 9.0 |
| 11.0 | 42.7 | 35.7 | 13.8 | 7.8 |

It can be concluded that the values for D10 and D90 should be as in Table 1b:

TABLE 1b

| particle size | Size (µm) | Ni (mol %) | Al (mol %) |
|---|---|---|---|
| D90 | 15.5 | >44.1 | <5.5 |
| D10 | 5.2 | <41.0 | >10.0 |

As can be deduced from FIG. 2, there is a very good correlation between Ni and Al content (mol %) with particle size as measured from laser granulometry, the linear trend (mol % Ni=s·D+t1 and mol % Al=u·D+t2) being:

for Ni: Ni (mol %)=0.32·D+39.2
for Al: Al (mol %)=−0.46·D+12.6.

In an embodiment of the invention, the dependency (in % mol) of Ni and M' (preferably Al) with particle size follows a linear trend % mol Ni=s·D+t1, and % mol M'=u·D+t2, D being the particle size as measured from SEM pictures, with s>0 or Abs(s)>0.1, preferably >0.2, and more preferably >0.3; and/or Abs(u)>0.1, preferably >0.2, and more preferably >0.3.

Moreover, EDS analysis on a cross section of a single particle (see FIG. 3) clearly shows that the Ni/Mn/Co/Al distribution within a particle is fully homogeneous, with no composition gradient. This allows for optimized electrochemical performances by minimizing the stresses that could occur upon cycling during Li deintercalation/intercalation.

The XRD pattern shows a single phase material corresponding to NMCA. Use of the Rietveld refinement software Topas allows obtaining the X-ray crystallite size. The crystallite size is related to the peak broadening. A large size means narrow peaks. If the sample has a size dependent composition there will be a distribution of peak positions around the position of the average composition. As a result the Rietveld refinement of a size dependent composition will have a smaller size than that of a fixed (i.e. not dependent on size) composition. The Rietveld refinement of the composition of Example 1 results in a crystallite size of 134 nm. This value is relatively low and indicates—despite of the high synthesis temperature—the coexistence of several slight deviations from the global composition, due to the fact that particles with slightly different composition coexist within the powder. The hexagonal cell parameters as calculated from XRD (full pattern matching refinement) are a=2.864(1) Å and =14.264(8) Å.

A slurry is prepared by mixing the NMCA powder of Example 1 with 5% wt carbon black and 5% PVDF into N-Methyl Pyrrolidone (NMP), and is deposited on an Al foil as current collector. The obtained electrode containing 90% wt active material is used to manufacture coin cells with about 14 mg/$cm^2$ active material. As electrolyte a $LiPF_6$ based electrolyte is used. The negative electrodes are made of metallic Li. Capacity and rate performance of the coin cells are tested between 3.0 and 4.3V vs Li+/Li, followed by a stability test at 4.5-3.0V. FIG. 4 shows that a high reversible capacity is obtained upon cycling with a reversible capacity of 143 mAh/g at a discharge rate of C/10 (Cycle 1: full discharge in 10 h). In the figure the voltage is shown against the cathode capacity during 6 consecutive cycles—the discharge capacities of the cycles are shown from right to left for Cycle 1 to Cycle 6.90% of the capacity is retained at a discharge rate of C (Cycle 4: full discharge in 1 h) with 129 mAh/g, and 85% is obtained at a discharge rate of 2 C (Cycle 5: full discharge in ½ h) with 121 mAh/g.

For completeness the cycles' discharge rate is listed below:
Cycle 1: C/10 (1st to the right on FIG. 4)
Cycle 2: C/5
Cycle 3: C/2
Cycle 4: 1 C
Cycle 5: 2 C
Cycle 6: 3 C (most left on FIG. 4).

EXAMPLE 2

Counter Example

In a first step, an NMCA hydroxide material with molar composition 41.8:35.7:14.1:8.4 is precipitated from Ni, Mn, Co and Al sulphates in the presence of NaOH and Ammonia. The average particle size as measured from laser granulometry is centered around D50=8.5 µm (D10=2.0 µm, D90=18.0 µm).

In a second step, the hydroxide is mixed with $Li_2CO_3$ such that Li/(Ni+Mn+Co+Al)=1.075. The mixture is then heated in a chamber furnace under ambient air at 980° C. for 10 h. The composition of the obtained $Li_dNi_xCo_yAl_zO_2$ powder as deduced from ICP is Ni:Mn:Co:Al 42.1:34.5:14.2:9.2.

The particle size distribution from the product after firing is measured by laser diffraction granulometry and gives a PSD with D10=2.4 µm, D50=7.8 µm, D90=20.1 µm. The EDS analysis performed on the product of the counter example shows that the composition does not vary substantially with the particle size (see FIG. 5 & Table 2). It has to be noted that molar concentrations measured using EDS cannot be taken as absolute values and that they can differ slightly from ICP data. However, EDS allows for relative comparison of molar concentrations between different particle sizes.

TABLE 2

Molar composition (Ni:Mn:Co:Al) according to particle size.

| Size from SEM (µm) | EDS Ni (mol %) | EDS Mn (mol %) | EDS Co (mol %) | EDS Al (mol %) |
|---|---|---|---|---|
| 2 | 46.6 | 32.5 | 15.4 | 5.5 |
| 4 | 47.0 | 31.7 | 16.0 | 5.2 |
| 10 | 45.3 | 34.9 | 14.5 | 5.3 |
| 21 | 46.6 | 33.5 | 15.6 | 5.1 |

The figures for particles corresponding to the D10 and D90 values correspond to the ones in Table 2.

As can be deduced from FIG. 5, there is a no correlation between Ni and Al content (mol %) and particle size as measured from the SEM picture (D). Notwithstanding this, if a trend is calculated, it is as follows:
for Ni: Ni (mol %)=−0.0575·D+46.717
for Al: Al (mol %)=−0.016·D+5.4376

The s and u factor in the equations (mol %=s (or u)·D+t1 (or t2)) being close to 0 confirms that the Ni and Al contents are constant in the powder.

The XRD pattern shows a single phase material corresponding to NMCA. Use of the Rietveld refinement software Topas allows to obtain the X-ray crystallite size. The Rietveld refinement of the composition of Example 2 results in a crystallite size of 148 nm. This value is significantly larger than that obtained for the size dependent composition sample described in example 1, which demonstrates that Example 2 has more narrow X-ray peaks. As expected, and in contrast with Example 1, the narrow XRD lines are typical for a product synthesized at high temperature, and suggest that the Ni, Co and Al elements are homogeneously distributed within the powder. The hexagonal cell parameters as calculated from the XRD are a=2.863(4) Å and c=14.247(1) Å. These are considered to be equivalent to those from the product obtained in Example 1—the difference being within the error margin of the cell parameter refinement. FIG. 6 compares the shape of selected peaks (003, 110 and 018). The sample without size dependent composition is represented by line 2, with size dependent composition by line 1. The figure clearly shows the more narrow peaks obtained for the sample without size dependent composition. The sample without size dependent composition shows a lower FWHM and for the 018 & 110 peaks we can see a separation into the $K_{a1}$ and $K_{a2}$ doublet, which cannot be distinguished in the size dependent sample.

A slurry is prepared by mixing the LNMCO powder obtained according to Example 2 with 5% wt carbon black and 5% PVDF into N-Methyl Pyrrolidone (NMP), and is deposited on an Al foil as current collector. The obtained electrode containing 90% wt active material is used to manufacture coin cells, with about 14 mg/$cm^2$ active material. As electrolyte a $LiPF_6$ based electrolyte is used. The negative electrodes are made of metallic Li. Capacity and rate performance of the coin cells are tested between 3.0 and 4.3V vs Li+/Li, followed by a stability test at 4.5-3.0V. FIG. 7 (with data representation as in FIG. 4) shows that the reversible capacity obtained upon cycling has a reversible capacity of only 135 mAh/g at a discharge rate of C/10. Only 87% of the capacity is retained at a discharge rate of C with 118 mAh/g, and 82% is obtained at a discharge rate of 2 C with 111 mAh/g, i.e. 8% less capacity at high rate than the product according to the invention. This clearly emphasizes the benefit of the invention as compared to state of the art materials regarding power properties of NMCA materials.

EXAMPLE 3

5 $LiNi_{0.47}Mn_{0.38}Co_{0.15}Al_xO_2$ compounds were prepared with different molar compositions of Al (x=0%, 1.5%, 3%, 5% and 10%) and measured using DSC (differential Scanning calorimetry) to illustrate the positive influence of Al-content on the safety performance. Small electrodes, containing about 3.3 mg of active material are punched and assembled in coin cells. Coin cells are charged to 4.3V using a C/10 charge rate followed by a constant voltage soak for at least 1 h. After disassembly of the coin cells electrodes are repeatedly washed in DMC to remove remaining electrolyte. After evaporating the DMC the electrodes are immersed into stainless steel cans and about 1.2 mg of PVDF based electrolyte is added, following by hermetic closing (crimping) of the cells. The DSC measurement is performed using a TA instrument DSC Q10 device. The DSC scan is performed from 50-350° C. using a heat rate of 5K/min. DSC cells and crimping equipment were also supplied by TA The total energy released by the exothermic decomposition of the electrode material upon heating is given in Table 3.

TABLE 3

DSC data on safety performance as a function of Al-content in $LiNiMnCoAlO_2$ cathode material.

| Al (mol %) | Temperature at max (° C.) | Energy released (kJ) | Capacity (mAh/g) | Energy released per capacity (kJ g/mAh) |
|---|---|---|---|---|
| 0 | 304.9 | 1023.8 | 183.1 | 5.6 |
| 1.5 | 301.9 | 1082 | 180.6 | 6.0 |
| 3 | 311.4 | 992.8 | 181.1 | 5.5 |
| 5 | 309.4 | 994.5 | 177.2 | 5.6 |
| 10 | 317.7 | 859.1 | 174.1 | 4.9 |

As can be seen in Table 3, with increasing Al-content the total energy released decreases and the temperature of max heat flow increases. Especially when going to a sufficiently high Al-content of ~10%, the gain in safety performance is substantial as compared to lower Al-contents. This clearly illustrates the advantage of having a size dependent Al-composition and as such proves that the small particles, which are known to be intrinsically less safe, will benefit from a higher Al-content. Furthermore, these data show that the Al content should be sufficiently high and that the difference in Al-content between the big D90 and small D10 particles should be sufficiently big in order to get the maximum gain in safety performance.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A lithium metal oxide powder for use as a cathode material in a rechargeable battery, having a general formula $Li_a Ni_x Co_y Mn_{y'} M'_z O_{2\pm e} A_f$, wherein
$0.9 < a < 1.1$, $0.3 \le x \le 0.9$, $0 \le y \le 0.4$, $0 \le y' \le 0.4$, $0 < z \le 0.35$, $e < 0.02$, $0 \le f \le 0.05$ and $0.9 < (x+y+y'+z+f) < 1.1$;
wherein M' comprises one or more elements selected from the group consisting of Al, Mg, Ti, Cr, V, Fe and Ga; A comprises one or more elements selected from the group consisting of F, C, Cl, S, Zr, Ba, Y, Ca, B, Sn, Sb, Na and Zn; and the powder has a particle size distribution defining a D10 and a D90; wherein either:

$x1-x2 \ge 0.005$; or $z2-z1 \ge 0.005$; or both $x1-x2 \ge 0.005$ and $z2-z1 \ge 0.005$;
x1 and z1 being molar contents of Ni and M', respectively, of particles having a particle size D90; and x2 and z2 being molar contents of Ni and M', respectively, of particles having a particle size D10, and
wherein the molar contents of Co and Mn are not correlated to particle size.

2. The oxide powder of claim 1, wherein both $x1-x2 \ge 0.020$ and $z2-z1 \ge 0.020$.

3. The oxide powder of claim 1, wherein the Ni content of the powder increases with increasing particle size, and the M' content of the powder decreases with increasing particle size.

4. The oxide powder of claim 1, wherein A comprises S and C, with $f \le 0.02$, and M' comprises Al.

5. The oxide powder of claim 1, wherein A comprises C, with $f \le 0.01$, and M' comprises Al.

6. A process for the manufacture of the powder of claim 1, comprising:
providing an M-precursor powder, wherein $M=Ni_x Co_y Mn_{y'} M'_z A_f$ having a particle size distribution defining a D10 and a D90; wherein either $x1-x2 \ge 0.005$; or $z2-z1 \ge 0.005$; or both $x1-x2 \ge 0.005$ and $z2-z1 \ge 0.005$; x1 and z1 being the values of x and z of particles having a particle size D90; and x2 and z2 being the values of x and z of particles having a particle size D10, mixing the M-precursor powder with a lithium precursor, and heating the mixture at a temperature of at least 800° C.

7. The process of claim 6, wherein the lithium precursor is lithium carbonate.

8. The process of claim 6, wherein providing an M-precursor powder comprises:

providing at least two M-precursor powders having a different particle size distribution, wherein the at least two M-precursor powders have different D10 and D90 values, and wherein an M-precursor powder having a lower D10 and D90 value has either one or both of a lower Ni content and a higher M' content than an M-precursor powder having a higher D10 and D90 value; and mixing the at least two M-precursor powders.

9. The process of claim 8, wherein the at least two M-precursor powders are mixed with a lithium precursor, before heating the mixture at a temperature of at least 800° C.

10. The process of claim 8, wherein the M-precursor powders comprise hydroxide or oxyhydroxide compositions obtained by precipitating metal sulphates, nitrates, chlorides or carbonates in the presence of an alkali hydroxide and a chelating agent.

11. The process of claim 10, wherein the chelating agent is ammonia.

12. The process of claim 8, wherein for the at least two M-precursor powders, both the Ni content of the powder having a lower D10 and D90 value is lower than the Ni content of the powder having a higher D10 and D90 value, and the M' content of the powder having a lower D10 and D90 value is higher than the M' content of the powder having a higher D10 and D90 value.

13. The process of claim 8, wherein the difference between the Co content of the M-precursor powder having a lower D10 and D90 value, and the Co content of the M-precursor powder having a higher D10 and D90 value, is less than each one of the differences between the Ni and M' contents of the M-precursor powders; and the difference between the Mn content of the M-precursor powder having a lower D10 and D90 value, and the Mn content of the M-precursor powder having a higher D10 and D90 value, is less than the difference between each one of the Ni and M' contents of the M-precursor powders.

14. The powder of claim 2, wherein both $x1-x2 \ge 0.030$ and $z2-z1 \ge 0.030$.

* * * * *